United States Patent [19]
Schindler

[11] 3,818,320
[45] June 18, 1974

[54] HIGH GAIN PHASE CONTROL CIRCUIT
[76] Inventor: Mark Schindler, 195 Greenfield Ave., Los Angeles, Calif. 90049
[22] Filed: Aug. 7, 1972
[21] Appl. No.: 278,418

Related U.S. Application Data
[63] Continuation-in-part of Ser. No. 175,931, Aug. 30, 1971, abandoned.

[52] U.S. Cl.................. 323/20, 219/494, 219/501, 323/19, 323/24, 323/34
[51] Int. Cl. .......................................... G05d 23/24
[58] Field of Search ......... 307/252 B, 252 F; 323/4, 323/19, 20, 22 SC, 24, 34, 36

[56] References Cited
UNITED STATES PATENTS

| | | | |
|---|---|---|---|
| 3,375,403 | 3/1968 | Flieder............................ | 323/34 UX |
| 3,389,328 | 6/1968 | Janson............................. | 323/24 X |
| 3,475,677 | 10/1969 | Swinehart et al................ | 323/24 X |
| 3,487,292 | 12/1969 | Tibbetts........................... | 323/34 |
| 3,636,379 | 1/1972 | Moe et al. ...................... | 307/252 F |
| 3,668,515 | 6/1972 | Horne.............................. | 323/24 X |
| 3,712,991 | 1/1973 | Albright.......................... | 307/252 F |
| 3,719,858 | 3/1973 | Gilbreath........................ | 323/22 SC |

*Primary Examiner*—A. D. Pellinen

[57] ABSTRACT

A phase control circuit is provided which includes a zener diode across a full wave rectifier that is used to form a pulsating d.c. waveform each half cycle of an a.c. supply wave being used to supply power to a heating load. The circuit further includes a transistor having its base connected to conduct through the zener diode and its input connected to the output of the rectifier. By the use of such a circuit arrangement the transistor only conducts current for charging the phase control circuit during the period of each half cycle that the pulsating d.c. waveform reaches a level that causes the zener diode to conduct. Such a circuit arrangement provides for synchronizing the operation of the phase control cirucit with the a.c. supply wave and provides a non-conducting interval of time prior to the start of the charging of the phase control curcuit during each half cycle during which the circuit is able to recover from its previous firing.

7 Claims, 2 Drawing Figures

HIGH GAIN PHASE CONTROL CIRCUIT

CROSS REFERENCE TO RELATED APPLICATION

This application is a continuation-in-part of copending application Ser. No. 175,931 filed Aug. 30, 1971 and now abandoned.

This invention relates to phase control circuits and more particularly to an improved circuit arrangement for a high gain phase control circuit.

Phase control circuits are commonly used to control the power to a load by controlling the point in time within each half cycle of an a.c. supply wave at which a thyristor will turn on. The circuits that are presently available in the art for this purpose are not satisfactory since they are not readily adaptable to simply providing high energy firing pulses capable of controlling high powered thyristors, and any attempt to substitute higher energy components in the circuits results in unreliable operation thereof. Furthermore, these circuits are limited to operating at relatively low frequencies which greatly hampers the use that can be made of them.

Accordingly, one of the objects of the present invention is to provide a simple, reliable, phase control circuit for generating high energy output pulses for switching a high powered thyristor.

Another object of the present invention is to provide an improved, simplified, circuit arrangement in a phase control circuit for controlling the charging current and synchronizing the operation of the relaxation oscillator thereof with an a.c. supply wave.

Another object of the present invention is to provide a circuit arrangement for a phase control circuit including a relaxation oscillator which provides a recovery interval for the relaxation oscillator after it is triggered during half cycle so as to permit the charges on the circuit components to be neutralized prior to again charging the relaxation oscillator during the next half cycle.

Another object of the present invention is to provide a phase control circuit which permits a higher frequency of operation.

In accordance with a particular embodiment of the invention these objects are accomplished by employing a zener diode across a full wave rectifier which provides a pulsating d.c. waveform each half cycle of the a.c. supply wave. A transistor having its base connected to the zener diode and its emitter connected to the output of the rectifier provides for conducting current to charge the charging capacitor of a relaxation oscillator only during the period of each half cycle that the pulsating d.c. waveform exceeds the breakdown voltage of the zener diode. This arrangement provides for synchronizing the operation of the relaxation oscillator with the a.c. supply wave during each half cycle and further provides an interval of time prior to the start of charging of the charging capacitor during which no charging current is applied to thereby enable the switching device of the relaxation oscillator to recover after it fires.

These and other objects, features and advantages of the present invention will appear more fully upon consideration of the specific illustrative embodiment shown in the accompanying drawings, in which.

Figure 1:
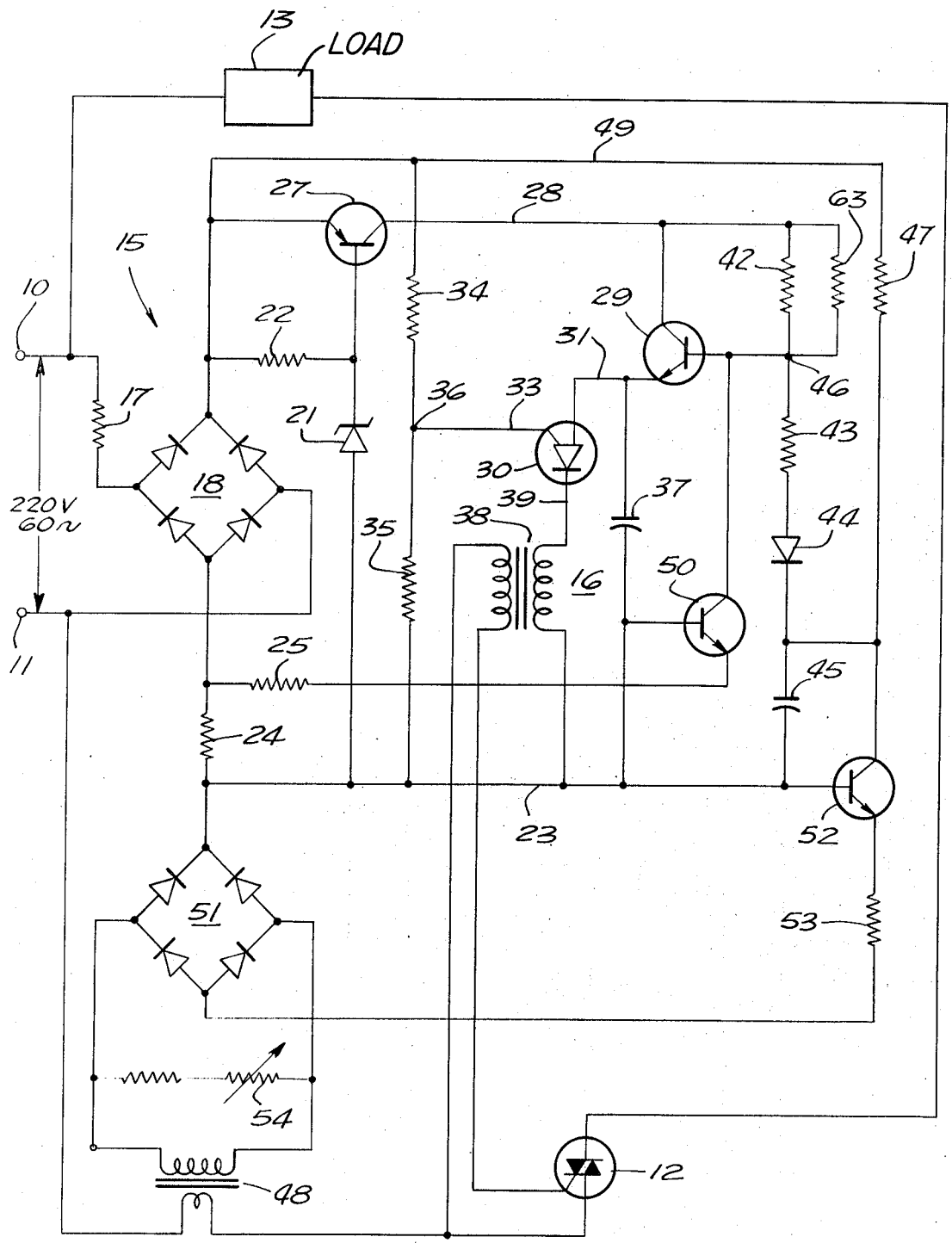
FIG. 1 shows a preferred embodiment of the phase control circuit of the present invention used for controlling a triac to supply power to a load.

Referring to FIG. 1 a 220 volt, 60 cycle a.c. power supply is connected across terminals 10 and 11 of a circuit comprised of a high powered triac 12 connected in series with a load which for the embodiment shown is a heater 13. Also connected across terminals 10 and 11 is the phase control circuit 15 of the present invention which includes a relaxation oscillator 16 formed of a programmable unijunction transistor 30, hereinafter designated as PUT 30, and the circuitry associated therewith. The phase control circuit 15 provides for controlling the power supply to the heater load 13 by turning on the triac 12 at a selected point of time or phase angle during each of the positive and negative half cycles of the a.c. supply wave. Since the triac 12 is a latching device once it is turned on it will stay on for the remainder of that half cycle.

The a.c. wave supplied across terminals 10 and 11 passes through a current limiting resistor 17 to a full wave bridge rectifier 18. A zener diode 21 has its cathode connected by a resistor 22 to the positive output side of the rectifier 18 and its anode connected to a common line 23 which is connected by a resistor 24 to the return side of the rectifier 18. The zener diode 21 serves to clip the peaks of the a.c. supply wave. A p-n-p transistor 27 has its emitter connected to the positive side of the rectifier 18, its base connected to the cathode of zener diode 21 and its collector connected to a conductor 28.

An n-p-n transistor 29 has its collector connected to conductor 28 and its emitter connected to the anode 31 of the PUT 30. A voltage divider comprised of resistors 34 and 35 is connected between the output of the rectifier 18 an the common line 23. The common junction 36 of resistors 34 and 35 is connected to the gate 33 of the PUT 30. The PUT 30 is adapted to function as a relaxation oscillator 16 by having a charging capacitor 37 coupled from the anode 31 of the PUT 30 to the common line 23. In order to fire the PUT 30, the capacitor 37 must be sufficiently charged to forward bias the anode 31 relative to the gate 33. A primary winding of a pulse transformer 38 is connected between the cathode 39 of the PUT 30 and the common line 23. The secondary winding of the pulse transformer 38 is connected as shown between the gate and an appropriate anode of the triac 12.

A charging circuit for the capacitor 37 is connected between the conductor 28 and the common line 23. This charging circuit includes a series string comprising a resistor 42, a resistor 43, a diode 44 and a timing capacitor 45. The common junction 46 of the resistors 42 and 43 is connected to the base of transistor 29. A path 49 leading from the output side of the rectifier 18 to the timing capacitor 45 includes a resistor 47 and serves to aid in charging the timing capacitor 45.

The phase control circuit is provided with a feedback circuit for controlling the charge of the timing capacitor 45 so as to maintain the phase angle of firing of the phase control circuit 15 at a desired setting. The feedback circuit in this embodiment includes a current transformer 48 having a single turn primary winding located in the series circuit including the heater load 13, and a multiturn secondary winding connected across a bridge rectifier 51. This feedback circuit further includes a discharging n-p-n transistor 52 having its collector connected to the positive side of the capacitor 45, its emitter connected through a resistor 53 to the return side of the rectifier 51 and its base connected by the common line 23 to the positive output side of rectifier 51. A potentiometer 54 is connected across the secondary winding of the current transformer 48 for adjusting the setting of the feedback circuit.

The phase control circuit 15 of the present invention is also provided with an inverse cosine correction for the ramp portion of a charge provided on the capacitor 37. This inverse cosine correction circuit includes an n-p-n transistor 50 having its base connected to the common line 23, its collector connected to the base of transistor 29 and its emitter connected to the negative side of resistor 24.

OPERATION

The operation of the phase control circuit 15 shown in FIG. 1 will next be described by reference to the typical waveforms appearing at different points of the circuit as illustrated in FIGS. 2a –2j. The waveforms shown in solid lines in FIG. 2a –2j correspond to voltage waveforms appearing at various points of the circuit for one setting of the potentiometer 54, and the changes in these waveforms as shown by the dashed lines correspond to voltage waveforms appearing at the various points of the circuit for another setting of the potentiometer 54.

Figure 2:
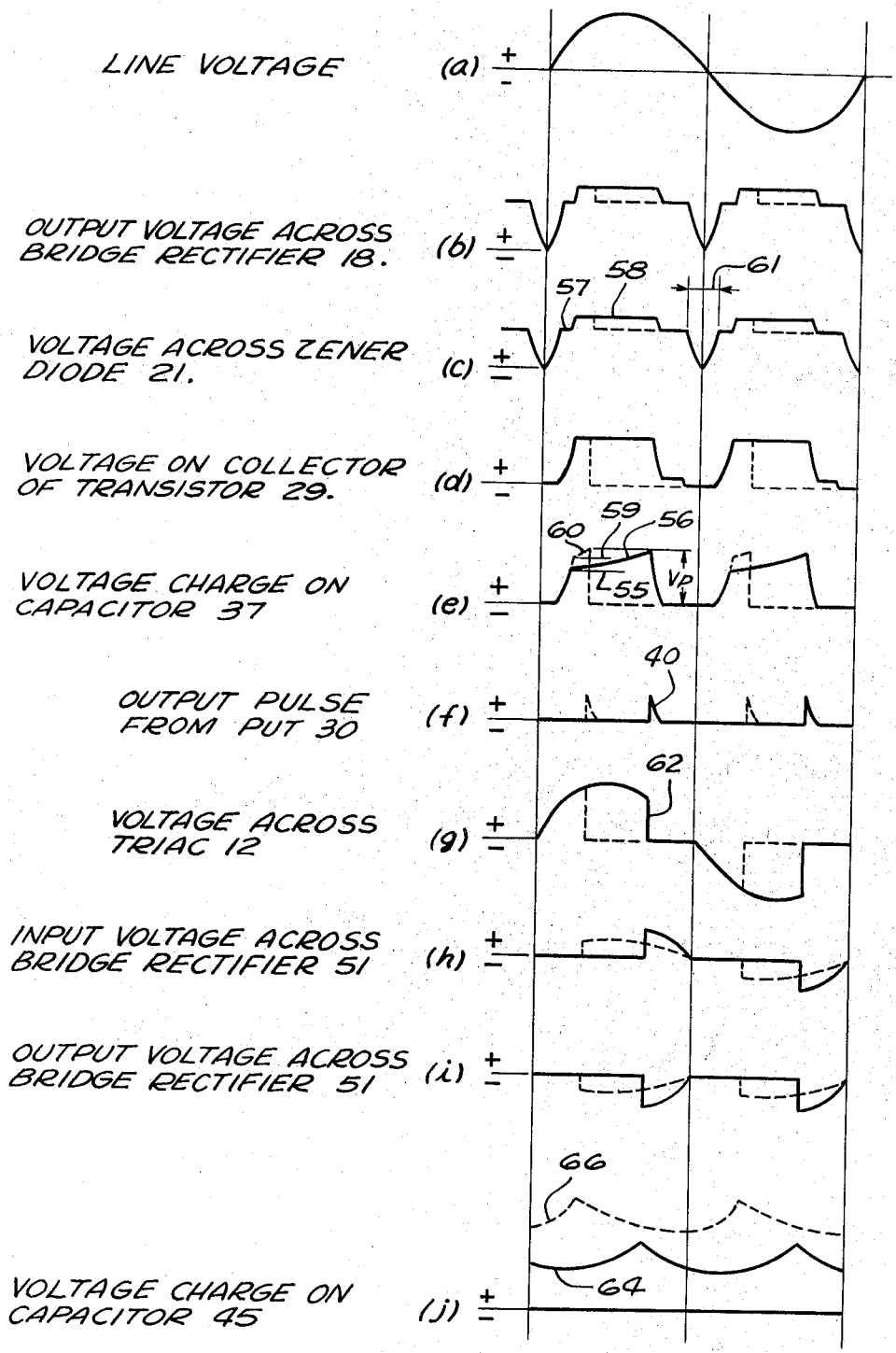
FIGS. 2a – 2j show typical waveforms at various points of the circuit shown in FIG. 1.

The description of the operation of the phase control circuit 15 will first be described for the setting of the potentiometer 54 corresponding to the solid waveforms. Thus an a.c. waveform representing a full cycle of the supply voltage of the 220 volt a.c. power source is shown in FIG. 2a. This a.c. wave after passing through rectifier 18 and being clipped by zener diode 21 forms a pulsating d.c. waveform during each half cycle of the a.c. wave, as shown in FIG. 2b. A similarly shaped pulsating d.c. waveform which takes into account the voltage drop across the base-emitter junction of transistor 27 and illustrates the voltage waveform across zener diode 21, is shown in FIG. 2c. It should be noted that the flat portion 57 of the waveform in FIG. 2c represents the breakdown volrage of the Zener diode 21 when it first starts to conduct. In order for transistor 27 to conduct it is necessary for its emitter to be at a higher potential than its base. Inasmuch as th base of transistor 27 is clamped by the zener diode 21, current cannot flow in the base until the emitter of transistor 27 is higher than the breakdown voltage of the zener diode. Thus, charging current wil not flow from the emitter to the collector output of transistor 27 until the pulsating d.c. waveform across the zener diode 21 rises to the level to cause the zener diode 21 to conduct.

During the half cycle when the input waveform exceeds the breakdown voltage of zener diode 21, transistor 27 conducts charging current which passes through transistor 29 and quickly charges capacitor 37 to its pedestal voltage level 55, as shown in FIG. 2e. It should be noted that the pedestal voltage level is controlled by the voltage on the base of transistor 29 as determined by the series string of resistor 42, resistor 43, diode 44 and the voltage charge left on timing capacitor 45 as a result of the prior half cycle operation. When the charging capacitor 37 reaches the pedestal level 55, the conduction through transistor 29 to form the ramp 56 of the charge on capacitor 37 increases much more slowly inasmuch as this conduction is dependent on the rate at which the voltage on the base of transistor 29 rises as the charge on the capacitor 45 is built up in accordance with its RC time constant.

It should be noted that the voltage across the zener diode 21 is initially at a lower level 57 during the time the transistor 29 is heavily conducting to form the pedestal level 55. However, less current is drawn through the transistor 29 to form the ramp 56, resulting in a greater amount of the current of transistor 27 passing through the zener diode 21 and causing the voltage across the zener diode 21 to be at a higher level 58.

When the combined magnitude of the ramp and pedestal voltage raises the anode 31 of PUT 30 to the critical breakdown voltage Vp (FIG. 2e) for the PUT 30, the anode 31 to gate 33 of the PUT 30 becomes forward biased. This generates a negative resistance characteristic from the anode 31 to the cathode 39 of the PUT 30 and results in the PUT 30 breaking down, i.e., switching on. The instant that the PUT 30 breaksdown the capacitor 37 discharges and produces a sharp output pulse 40 as indicated by the waveform in FIG. 2f on the secondary winding of the pulse transformer 38 which turns on the triac 12. The discharge of the PUT 30 lowers the voltage on the emitter of transistor 29. As a consequence during the interval that the PUT 30 collapses, current flows through the collector of transistor 29. This flow of current continues until the pulsating d.c. waveform (FIG. 2c) drops below the breakdown voltage level of the zener diode 21 at which time the transistor 27 no longer conducts. Thus, charging current ceases for the remainder of the half cycle and remains cut-off until the voltage level of the pulsating d.c. waveform reaches the breakdown voltage on the zener diode 21 during the next half cycle of the a.c. supply wave.

There is thus provided an interval 61, shown in FIG. 2c, which includes the end portion of one half cyle and the beginning portion of the following half cycle during which the voltage of the input pulsating d.c. waveform is less than the breakdown voltage of the zener diode 21 and no charging current is provided for the charging capacitor 37. This assures that the PUT 30 has an opportunity to recover, that is, to have the charge drained out of it so that it can block the flow of current when the capacitor 37 is again charged during the next half cycle of the a.c. supply wave. It should be noted that the relatively long recovery time provided for PUT 30 during each half cycle enables the phase control circuit of the present invention to be reliably used in applications where operating frequencies are required of up to 10,000 cycles per second.

It should be particularly noted that the operation of the relaxation oscillator 16, i.e., the charging of the capacitor 37, is effectively synchronized with the a.c. supply wave during each half cycle by starting to charge the capacitor 37 at a predetermined voltage level of the pulsating d.c. waveform as determined by the breakdown voltage of the zener diode 21.

The sharp output pulse 40 produced on the secondary winding of the pulse transformer 38 in the cathode 39 of the PUT 30, as shown in FIG. 2f, serves to turn on the triac 12 at the point in time designated 62 of the half cycle, as shown in FIG. 2g. The triac 12 then remains on during the remainder of the half cycle. During the time the triac 12 is turned on, a.c. power is supplied to the heater load 13. This current in the form of a phase controlled a.c. wave is sensed by the current transformer 48 and is applied as a voltage waveform, shown in FIG. 2h, to rectifier 51 which provides on its output a negative d.c. feedback nrect0iiiesr519height 55, provided on capacitor 37. The time required for the ramp charge 56, obtained by charging capacitor 45 through resistors 42, 43 ane 47, to bring the voltage to which capacitor 37 is charged to the critical breakdown voltage of the PUT 30 thus determines the phase angle of the firing of the PUT. It should b noted that capacitor 45 serves as a lag element in the feedback signal, as shown in FIG. 2i. This feedback signal is used to bias on transistor 52 so as to discharge timing capacitor 45 through the resistor 53.

It should be noted that the amount of charge remaining on capacitor 45 at the start of the charging portion of each half cycle, namely at time 64 of the waveform in FIG. 2j, determines the height of the pedestal of the charge, in this case pedestal height 55, provided on capacitor 37. The time required for the ramp charge 56, obtained by charging capacitor 45 through resistors 42, 43 and 47, to bring the voltage to which capacitor 37 is charged to the critical breakdown voltage of the PUT 30 thus determines the phase angle of the firing of the PUT. It should be noted that capacitor 45 serves as a lag element in the feedback loop in the relaxation oscillator 16. It should further be noted that when power is initially applied across terminals 10 and 11, capacitor 45 delays the start of the output pulsing of the relaxation oscillator 16. That is, when the charging current is first supplied to transistor 29, the timing capacitor 45 is completely discharged thus assuring that power is applied slowly across the heater load 13 until the phase control circuit 15 reaches a steady state condition as determined by the setting of the potentiometer 54. This is known in the art as a soft start.

The potentiometer 54 connected across the secondary winding of the current transformer 48 can be adjusted to vary the phase angle of the firing of the traic 12 to thereby control the temperature to which water passing through the heater 13 is heated. Thus, in order to increase, for example, the temperature of the water, the potentiometer 54 is adjusted to decrease the resistance thereof. As a result the magnitude of the feedback signal is decreased. Consequently a smaller amount of charge is removed from the timing capacitor 45 through the transistor 52 in response to the feedback signal during each half cycle. The stable condition to which the various points of the circuit settle as a result of the new setting of the potentiometer 54 is indicated by the dashed waveforms in FIGS. 2b – 2j. Thus, as illustrated by the dashed waveform 66 in FIG. 2j, the voltage charge remaining on the capacitor 45 is higher and, as shown in FIG. 2e, under this condition, the pedestal height 59 of the charged waveform of the capacitor 37 is higher and the peak voltage Vp of the PUT 30 is reached earlier in the half cycle by the ramp 60. That is, the phase angle of operation is decreased, resulting in the triac 12 firing earlier in the half cycle, as shown in FIGS. 2e, 2f, and 2g, and a greater amount of current being supplied to the heater load 13.

The circuit comprising transistor 50 and the resistors 24 and 25 provides an inverse cosine correction on the ramp. When the zener diode 21 conducts there is a voltage drop across resistor 24. This drop in voltage makes the emitter of transistor 50 lower in potential than the base thereof so that transistor 50 draws current from resistor 42 through resistor 25 to the return side of rectifier 18. The increased current through resistor 42 slightly lowers the potential at the base of transistor 29 and has the effect of causing the ramp of the voltage charge waveform on capacitor 37 to increase less rapidly. It should be noted that resistor 24 is a current sensing resistor which provides its greatest drop when the a.c. input voltage is the highest. It is thus a peak current sensing resistor which provides the greatest cosine correction when the a.c. input waveform peaks.

This inverse cosine correction circuit is especially useful in preventing oscillation of the phase control circuit when a thermistor 63 is connected across the resistor 42. The thermistor 63 is located in the water being heated by the heater 13 and senses the temperature of the water. When the potentiometer 54 has been set to heat the water to a predetermined fixed temperature, if the temperature of the water should increase the thermistor 63 serves to vary the equilibrium of the charging circuit to cause less current to be applied across the heater 13, so as to minimize the change. Thus, under these conditions, the value of the resistor 42 is effectively made larger. The increased voltage drop across these resistors lowers the voltage at the base of transistor 29 which in turn lowers the value of the pedestal voltage charge formed on capacitor 37 and takes a longer time for the ramp voltage charge formed on capacitor 37 to reach the peak voltage Vp at which the PUT 30 will fire. As a result, the phase angle of the turning on of the triac 12 will be increased and a smaller amount of current will be provided across the heater 13 on successive half cycles.

While the invention has been illustrated and described in detail in the drawings and foregoing description, the same is to be considered as illustrative and not restrictive in character, it being understood that only the preferred embodiment has been shown and described and all changes and modifications that come within the spirit of the invention are also desired to be protected.

The invention claimed is:

1. A phase control circuit for controlling a thyristor to provide current across a load, said circuit comprising:
   a source of alternating current;
   a full-wave rectifier for converting said alternating current to provide a positive sine wave voltage during each half cycle of said alternating current:
   a relaxation oscillator including a switching device having a negative resistance characteristic and a charging capacitor therefor;
   circuit means including a zener diode having its anode connected to the negative side of said full-wave rectifier, and a p-n-p transistor having its emitter connected to the positive side of said full-wave rectifier and its base connected to the cathode of said zener diode, said p-n-p transistor conducting current on its collector to charge said charging capacitor during the time the sine wave voltage on its emitter is at a level to cause the voltage on its base to reach the breakdown voltage of said zener diode;
   a charging circuit including a first and second resistor and a timing capacitor connected in series between the collector of said p-n-p transistor and the negative side of said full-wave rectifier, and a n-p-n transistor having its collector connected to the collector of said p-n-p transistor, its emitter connected to said charging capacitor and its base connected to the common junction of said first and second resistor, the current from said p-n-p transistor providing for charging said charging capacitor through said n-p-n transistor as said timing capacitor charges on each half cycle until said charging capacitor reaches the triggering voltage level of said switching device, whereby said relaxation oscillator provides an output pulse to fire said thyristor; and feedback circuit means responsive to current supplied by said thyristor each half cycle to provide a feedback signal for resetting said timing capacitor by discharging it each half cycle to a preset value to thereby control the time required each half cycle for the charging circuit to charge said charging capacitor to the triggering level of said switching device.

2. A phase control circuit for controlling a thyristor to provide current across a load, said circuit comprising;

a source of alternating current;

a first full-wave rectifier for converting said alternating current to provide a positive sine wave voltage during each half cycle of said alternating current;

a relaxation oscillator including a switching device having a negative resistance characteristic and a charging capacitor therefor;

circuit means for synchronizing the operation of said relaxation oscillator with the alternating current during each half cycle thereof, said circuit means including a zener diode having its output connected to the return side of said first full-wave rectifier, and a first transistor having its input terminal connected to the output of said first full-wave rectifier and its base terminal connected to the input of said zener diode, said first transistor starting to conduct current on its output terminal to charge said charging capacitor when the positive sine wave voltage rises to a level to cause the voltage on its base terminal to reach the breakdown voltage of said zener diode and said first transistor ceasing to conduct charging current when said positive sine wave voltage falls to a level to cause the voltage on its base terminal to drop below the breakdown voltage of said zener diode;

a charging circuit including a series circuit comprising a first and second resistor and a timing capacitor, said series circuit connected between the output terminal of said first transistor and the return side of said first rectifier, and a second transistor having its input terminal connected to the output terminal of said first transistor, its output terminal connected to said charging capacitor, and its base terminal connected to the common junction of said first and second transistor, the current from said first transistor providing for charging said charging capacitor by initially heavily conducting and then more slowly conducting through said second transistor as the timing capacitor charges until said charging capacitor reaches the triggering level of said switching device, whereby said relaxation oscillator provides an output pulse to control said thyristor; and feedback means including a third transistor having its base terminal connected to the return side of said first full-wave rectifier and its input terminal connected to said timing capacitor, a current transformer responding to the current applied to the load by said thyristor, and a second full-wave rectifier responsive to the output of said current transformer to provide a feedback signal, and second rectifier being connected across the base terminal and output terminal of said third transistor, and said timing capacitor being discharged through said third transistor to a preset initial value in accordance with said feedback signal after the switching device has been triggered during each half cycle.

3. The invention in accordance with claim 2 including a potentiometer connected across the current transformer to vary the magnitude of the feedback signal and thereby vary the point in time during the half cycle when said relaxation oscillator provides an output pulse.

4. The invention in accordance with claim 2 including a fourth resistor for connecting the output of said first rectifier with the timing capacitor.

5. A phase control circuit for controlling a thyristor to provide current across a load, said circuit comprising:

a source of alternating current;

a full-wave rectifier for converting said alternating current to provide a positive sine wave voltage during each half cycle of said alternating current;

a relaxation oscillator including a switching device having a negative resistance characteristic and a charging capacitor therefor;

circuit means for synchronizing the operation of said relaxation oscillator with the alternating current during each half cycle thereof, said circuit means including a zener diode having its output connected to the return side of said full-wave rectifier, and a first transistor having its input terminal connected to the output of said full-wave rectifier and its base terminal connected to the input of said zener diode, said first transistor starting to conduct current on its output terminal to charge said charging capacitor when the positive sine wave voltage causes the voltage on its base terminal to reach the breakdown voltage of said zener diode and said first transistor ceasing to conduct charging current when the positive sine wave voltage causes the voltage on its base terminal to drop below the breakdown voltage of said zener diode;

a charging circuit including a first and second resistor and a timing capacitor connected in series between the output terminal of said first transistor and the return side of said full-wave rectifier, and a second transistor having its input terminal connected to the output terminal of said first transistor, its output terminal connected to said charging capacitor, and its base terminal connected to the common junction of said first and second resistor, the current from said first resistor providing for charging said charger capacitor by initially conducting heavily and then more slowly through said second transistor as said timing capacitor charges until said charging capacitor reaches the triggering voltage level of said switching device, whereby said relaxation oscillator provides an output pulse to control said thyristor;

feedback means responsive to current supplied by said thyristor each half cycle to provide a feedback signal for resetting said charging circuit to thereby control the time required each half cycle for the charging circuit to charge said charging capacitor to the triggering level of the switching device;

a thermistor connected across one of the resistors in said charging circuit;

a third resistor in the return line of said first rectifier for sensing the current therein when said zener diode conducts; and a fourth transistor having its input terminal connected to the base of said second transistor, its output terminal connected to the return side of said first rectifier, and its base terminal connected to the junction of said zener diode and said third resistor.

6. A phase control circuit for controlling a high powered thyristor to provide current across a load comprising:

a relaxation oscillator including a switching device having a negative resistance characteristic and a charging capacitor thereacross;

a supply of alternating current;

a full-wave rectifier circuit for converting said alternating current to provide a positive sine wave voltage during each half cycle of the alternating current;

a zener diode;

a first transistor circuit having its emitter connected to the output of said rectifier circuit and having its base connected to conduct through said zener diode, the output of said zener diode being connected to the return side of said rectifier means, said first transistor circuit conducting charging circuit on its collector when the positive sine wave voltage causes its base to reach the breakdown voltage of said zener diode;

a charging circuit including a second transistor having a voltage divider resistor connected to the base thereof and a timing capacitor;

said voltage divider resistor having one end thereof connected to the collector of said second gating transistor and the other end thereof connected by said timing capacitor to the return side of said rectifier means, said charging circuit responding to the charging current from said first transistor to initially heavily charge the charging capacitor of said relaxation oscillator to a level dependent upon the charge left stored on said timing capacitor during the last half cycle, and thereafter to more slowly charge said charging capacitor;

said relaxation oscillator collapsing to provide a firing pulse to fire said thyristor and provide a current to said load when the charging capacitor reaches the triggering potential of said switching device;

a feedback circuit responsive to the current passing to said load to provide a feedback signal;

said feedback circuit including means for discharging said timing capacitor in accordance with said feedback signal during the latter portion of each half cycle; and means for adjusting said feedback circuit to vary said feedback signal to thereby reset the point in time during each half cycle that said charging capacitor in said relaxation oscillator reaches the triggering potential of said switching device.

7. A phase control circuit for controlling a high powered thyristor to provide current across a load comprising:

a relaxation oscillator including a programmable unijunction transistor and a charging capacitor therefor;

an alternating current supply;

a full-wave rectifier for converting said alternating current to provide a positive sine wave voltage during each half cycle of said alternating current;

a zener diode having its output connected to the return side of said full-wave rectifier;

a first transistor having its input connected to the output of said full-wave rectifier and having its base connected to the input of said zener diode so as to conduct through said zener diode during the time the positive sine wave voltage causes the voltage in its base to exceed the breakdown voltage of said zener diode;

a second transistor having its input connected to the output of said first transistor and having its output connected to said charging capacitor;

a voltage control circuit for the base of said second transistor, said voltage control circuit connected between the output of said first transistor and the return side of said full-wave rectifier, and said voltage control circuit including a timing capacitor;

said second transistor conducting current from said first transistor to charge said charging capacitor of said relaxation oscillator in accordance with the rise of the potential produced on the base of said second transistor by said voltage control circuit, the time for charging said charging capacitor during each half cycle to the triggering level of said programmable unijunction transistor being dependent on an initial charge stored on said timing capacitor;

said relaxation oscillator collapsing to provide an output pulse to fire said thyristor when said charging capacitor reaches the triggering voltage level of said programmable unijunction transistor;

a feedback circuit responsive to the current passing through said thyristor to said load during each half cycle to provide a feedback signal to discharge said timing capacitor down to its initial charge; and manual means for resetting said feedback circuit to change the initial charge on said timing capacitor and thereby adjust the point in time during each half cycle that said charging capacitor reaches the triggering voltage level of said programmable unijunction transistor.

* * * * *